(12) United States Patent
Bernauer et al.

(10) Patent No.: US 6,487,770 B1
(45) Date of Patent: Dec. 3, 2002

(54) PROCESS FOR MANUFACTURING A ROTOR OR STATOR OF AN ELECTRIC MACHINE OUT OF SHEET METAL BLANKS

(75) Inventors: Christof Bernauer, Forbach (DE); Matthias Henschel, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,834
(22) PCT Filed: Jan. 15, 1999
(86) PCT No.: PCT/DE99/00055
§ 371 (c)(1), (2), (4) Date: Feb. 21, 2001
(87) PCT Pub. No.: WO99/56379
PCT Pub. Date: Nov. 4, 1999

(30) Foreign Application Priority Data

Apr. 23, 1998 (DE) .......................... 198 18 198

(51) Int. Cl.⁷ .............................................. H02K 15/02
(52) U.S. Cl. ........................................ 29/598; 310/254
(58) Field of Search ....................... 29/596, 598, 416, 29/609; 310/216, 217, 193, 254

(56) References Cited

U.S. PATENT DOCUMENTS

| | | | | |
|---|---|---|---|---|
| 4,993,290 A | * | 2/1991 | Obradovic | 83/82 |
| 5,107,159 A | * | 4/1992 | Kordik | 310/156.44 |
| 5,377,115 A | * | 12/1994 | Neuenschwander | 364/468 |
| 5,923,112 A | * | 7/1999 | Bertocchi et al. | 310/217 |
| 6,002,190 A | * | 12/1999 | Kieffer | 310/193 |
| 6,131,268 A | * | 10/2000 | Neuenschwander | 29/596 |

* cited by examiner

Primary Examiner—S. Thomas Hughes
Assistant Examiner—Stephen Kenny
(74) Attorney, Agent, or Firm—Ronald E. Greigg

(57) ABSTRACT

Rotors or stators of this kind are cut out from rolled sheet metal with a predominant magnetic direction and are stacked to form a rotor or stator lamination bundle. In order to largely compensate for a magnetic anisotropy of the rotor or stator lamination packet, when the sheet metal blanks are asymmetrical (A, B), they are cut out from the rolled sheet metal rotated in relation to one another with regard to the predominant magnetic direction. The process according to the invention can be used for electric machine rotors or stators comprised of sheet metal blanks.

2 Claims, 1 Drawing Sheet

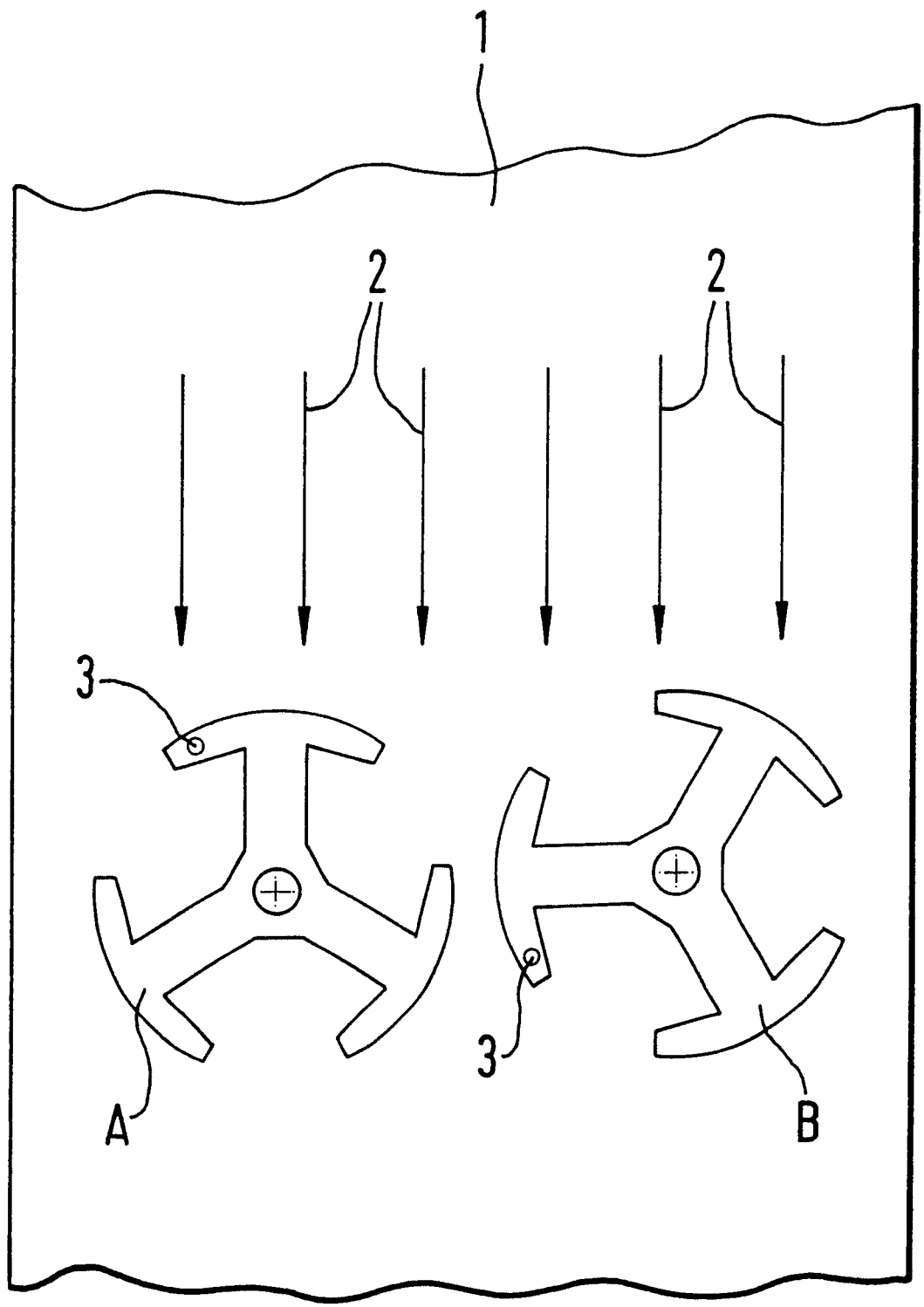

PROCESS FOR MANUFACTURING A ROTOR OR STATOR OF AN ELECTRIC MACHINE OUT OF SHEET METAL BLANKS

CROSS-REFERENCE TO RELATED APPLICATIONS

This is a 35 USC 371 application of PCT/DE 99/00055 filed on Jan. 15, 1999, which in turn claims priority to German application 19818198.1, filed Apr. 23, 1998.

PRIOR ART

A process of this kind for manufacturing a rotor of an electric machine, in which the sheet metal blanks stamped out with a die are embodied as point-symmetrical, has already been disclosed (DE 32 46 356 A1). The sheet metal blanks are disposed in the rotor lamination bundle, provided that the geometric embodiment of the blanks permits this, by random distribution or are disposed offset by a particular angle from the next sheet metal blank in the circumference direction. This should largely compensate for the magnetic anisotropy produced by the rolling process of the sheets. However, this process is unsuccessful when the sheet metal blanks are asymmetrical, since the non-rotatability leads to an uniform alignment of the predominant magnetic direction of all of the sheet metal blanks.

ADVANTAGES OF THE INVENTION

The process according to the invention, has the advantage over the prior art that with the acceptance of increased tool production costs, at least two batches of sheet metal blanks with different predominant magnetic directions are produced which, when congruently stacked in an alternating sequence, permit the magnetic anisotropy to be largely eliminated. Since the two batches of the sheet metal blanks can preferably be cut out in stamping tools with two dies (multiple cut), a high degree of materials utilization of the rolled sheet metal strip used can be achieved by means of favorable die disposition.

BRIEF DESCRIPTION OF THE DRAWING

An exemplary embodiment of the process according to the invention will be explained in detail in the description below in conjunction with the sole FIGURE, which depicts a sheet metal band section with two sheet metal blanks for a rotor of an electric machine.

DESCRIPTION OF THE EXEMPLARY EMBODIMENT OF THE PROCESS

A sheet metal band section 1 shown in the sole FIGURE has a predominant magnetic direction indicated with arrows 2 due to rolling procedures that are a part of its manufacture. With a stamping tool, not shown, a number of sheet metal blanks A and B for a rotor of an electric machine, which are disposed sequentially in the longitudinal direction of the sheet metal band 1, are stamped out of the sheet metal band by means of two dies. The one-piece sheet metal blanks A and B are embodied as congruent. However, they are asymmetrically embodied because of a form deviation 3. If a rotor lamination bundle were to be exclusively made up of layers of the sheet metal blanks A or the sheet metal blanks B, then the predominant magnetic direction 2 would be uniformly aligned in all of the sheet metal blanks in the respective lamination bundle. This would lead to a disadvantageous output behavior and noise behavior of the machine containing the lamination bundle.

According to the invention, therefore, the sheet metal blank B is disposed rotated by 90° counterclockwise in relation to sheet metal blank A. Thus the stamping tool produces two batches of rotor sheet metal blanks A and B in which, when disposed congruently with regard to the form deviation 3, the predominant magnetic directions 2 are rotated by 90° in relation to each other. In a rotor that is made up of alternating layers of sheet metal blanks A and B or groups of sheet metal blanks A and B, the magnetic anisotropy is thus largely compensated for.

The FIGURE shows only a schematic depiction of the exemplary embodiment of the process according to the invention. In a proper use, the tool dies required for manufacturing the rotor sheet metal blanks A and B are disposed in such a way that the sheet metal band 1 is utilized with a low percentage of waste. In the course of this, the width of the sheet metal band 1 is likewise matched to a low amount of sheet metal waste.

In contrast to the exemplary embodiment of the process, the sheet metal blanks A and B can also be rotated in relation to one another by between 10 and 170° with regard to the predominant magnetic direction, provided that the structural form of the rotor of the electric machine permits this. Furthermore, the process according to the invention can also be used in the manufacture of electric machine stators made up of layers of one-piece, congruent sheet metal blanks.

The foregoing relates to a preferred exemplary embodiment of the invention, it being understood that other variants and embodiments thereof are possible within the spirit and scope of the invention, the latter being defined by the appended claims.

We claim:

1. A process for manufacturing a rotor or stator of an electric machine out of one piece, congruent and asymmetrical sheet metal blanks (A, B), which are cut out from rolled sheet metal (1) with a predominant magnetic direction (2) and are stacked adjacent one another to form a rotor or stator lamination bundle, wherein adjacent sheet metal blanks of the lamination bundle are cut out from the rolled sheet metal (1) rotated by between 10 and 170° in relation to one another with regard to the predominant magnetic direction (2) of the sheet metal blank.

2. The process according to claim 1, in which the sheet metal blanks (A, B) are rotated by 90° in relation to one another with regard to the predominant magnetic direction (2) of the sheet metal blank.

* * * * *